No. 675,324. Patented May 28, 1901.
J. C. COTTIE.
RAZOR STROPPER.
(Application filed Nov. 16, 1900.)
(No Model.)
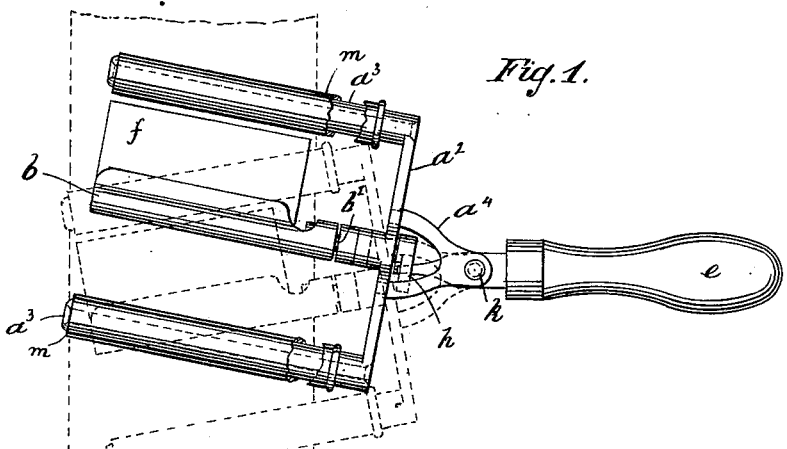
Fig. 1.
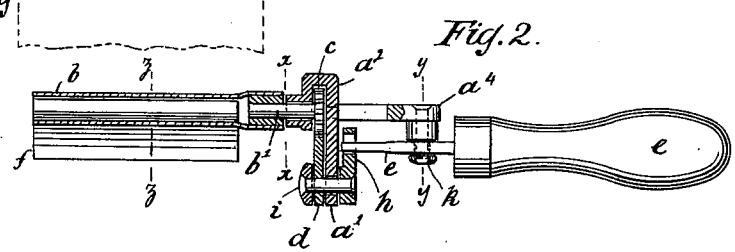
Fig. 2.
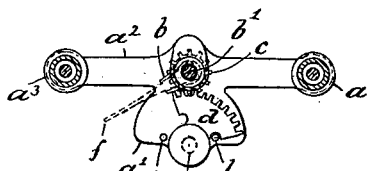
Fig. 3.
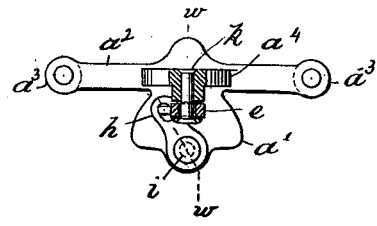
Fig. 4.
Fig. 5.
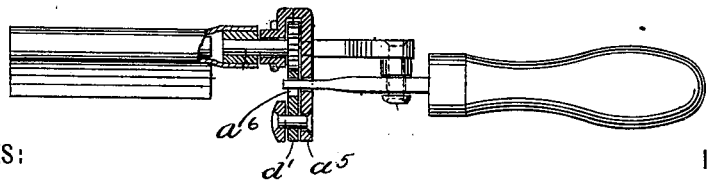
Fig. 6.
WITNESSES:
E. Wolff
Chas. E. Bensgen
INVENTOR
John C. Cottie.
BY Hauff & Hauff
ATTORNEYS

UNITED STATES PATENT OFFICE.

JOHN C. COTTIE, OF NEW YORK, N. Y., ASSIGNOR TO JEREMIAH REICHARD, OF SAME PLACE.

RAZOR-STROPPER.

SPECIFICATION forming part of Letters Patent No. 675,324, dated May 28, 1901.

Application filed November 16, 1900. Serial No. 36,731. (No model.)

*To all whom it may concern:*

Be it known that I, JOHN C. COTTIE, a citizen of the United States, residing in Manhattan borough, New York city, in the county and State of New York, have invented new and useful Improvements in Razor-Stroppers, of which the following is a specification.

This invention relates to a stropping machine or device by which a razor-blade can be satisfactorily sharpened or stropped along its entire extent or, as it might be expressed, "from heel to toe;" and the invention resides in the novel features of construction set forth in the following specification and claims and illustrated in the annexed drawings, in which—

Figure 1 is a plan view of the stropping device. Fig. 2 is a section of the frame along line $w$, Fig. 4. Fig. 3 is a section along line $x\,x$, Fig. 2. Fig. 4 is a section along line $y\,y$, Fig. 2. Fig. 5 is a section along line $z\,z$, Fig. 2. Fig. 6 shows a modification.

In the drawings is shown a frame comprising what may be called a "base" or "base part" $a'$, cross part $a^2$, arms $a^3$, and a rear part $a^4$. A blade-holder $b$ or its pivot part $b'$ is rotatable or rocks in the frame and is provided with a gear $c$, engaged by a sector $d$.

In speaking of part $d$ as a "toothed sector" it is of course understood that a disk or gear-wheel or the like is included; but as only a portion of the teeth of such wheel would mesh with the pinion $c$ a gear-sector $d$ is sufficient. A handle $e$ is arranged to actuate or rock the sector, so that pinion $c$, with holder $b$, is swiveled or rocked to cause the holder to move or slap first one face and then the other of blade $f$ to the strop $g$, which latter the arms $a^3$ are adapted to engage or rest on.

The sector $d$ has a crank-arm $h$, said sector and crank-arm being shown located at opposite sides of frame or depending part $a'$ and having a common pivot $i$, mounted on and extended through the frame. The handle $e$, fulcrumed at $k$ or to frame part or tail $a^4$, is jointed to crank $h$, and as the handle and frame rock relatively to one another about pivot $k$ the crank $h$ and sector $d$ are rocked, and consequently also the gear $c$ and the blade-holder. The frame is shown with stops or pins $l$, Fig. 3, which limit the swing or rock of the sector $d$ and blade-holder.

The device can be modified. Instead of having a crank $h$ engaged by the handle the latter could be extended to directly engage the sector $d'$, Fig. 6. In this case the base $a^5$ would be slotted, as at $a^6$, to allow swinging of the extended handle end or lever. The device with a crank has, however, been found satisfactory.

In the example shown in the drawings the arms $a^3$ are non-rotary, and in moving back and forth on the strop the friction will cause oscillation of the parts about pivot $k$ or varying angular positions between the frame and the handle. In an example tried practically the arms $a^3$ were also provided with a friction-surface $m$—say a sleeve or ring of rubber or like material having a tendency to grip or exert friction on the strop, and which sleeve was fixed or non-rotary. Such addition of a friction-surface has, however, not been found absolutely necessary, and in simpler or cheaper grades of goods could be omitted and the arms $a^3$ made to secure the desired grip or friction.

What I claim as new, and desire to secure by Letters Patent, is—

1. A razor-strapper comprising a frame having arms arranged to rest on a strop, a blade-holder rotatable in the frame and provided with a pinion, a sector pivoted to the frame and gearing with the pinion, and an oscillating handle pivoted to the frame and arranged to impart an oscillating movement to rock the blade-holder, substantially as described.

2. A razor-stropper comprising strop-engaging arms, a rotary blade-holder having a gear, a handle, and a gear-actuating sector having a crank engaged by the handle, said sector and crank being located at opposite sides of the frame substantially as described.

3. A razor-stropper comprising strop-engaging arms, a rotary blade-holder having a gear, a handle, a gear-actuating sector and a crank engaged by the handle, said sector and crank having a common pivot mounted on or extended through the frame substantially as described.

4. A stropping-machine comprising a frame with strop-engaging arms, a rotary bladeholder provided with a gear, a sector and handle for actuating the gear, and stops for limiting the movement of the sector substantially as described.

5. A razor-stropping machine comprising a frame with a base part $a'$, a tail part $a^4$ and arms adapted to engage a strop, a bladeholder rotatable in the frame and having a gear, a sector for actuating the gear, and a handle for actuating the sector, said sector and handle being respectively pivoted or fulcrumed in the base and tail of the frame substantially as described.

In testimony whereof I have hereunto set my hand in the presence of two subscribing witnesses.

JOHN C. COTTIE.

Witnesses:
H. REICHARD,
E. F. KASTENHUBER.